United States Patent
Singh

(10) Patent No.: US 12,470,456 B2
(45) Date of Patent: Nov. 11, 2025

(54) METHOD FOR CONVEYING AP ERROR CODES OVER BLE ADVERTISEMENTS

(71) Applicant: Juniper Networks, Inc., Sunnyvale, CA (US)

(72) Inventor: Gurpreet Singh, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/163,180

(22) Filed: Feb. 1, 2023

(65) Prior Publication Data

US 2023/0179472 A1  Jun. 8, 2023

Related U.S. Application Data

(63) Continuation of application No. 17/081,331, filed on Oct. 27, 2020, now Pat. No. 11,575,562, which is a continuation of application No. 16/296,902, filed on Mar. 8, 2019, now Pat. No. 10,862,742.

(51) Int. Cl.
| | |
|---|---|
| *H04L 12/24* | (2006.01) |
| *H04L 41/0677* | (2022.01) |
| *H04L 41/069* | (2022.01) |
| *H04W 4/80* | (2018.01) |
| *H04W 40/24* | (2009.01) |

(52) U.S. Cl.
CPC ........ *H04L 41/0677* (2013.01); *H04L 41/069* (2013.01); *H04W 4/80* (2018.02); *H04W 40/244* (2013.01)

(58) Field of Classification Search
CPC .... H04L 41/0677; H04L 41/069; H04W 4/80; H04W 40/244
USPC .................................. 370/241, 242
See application file for complete search history.

(56) References Cited

U.S. PATENT DOCUMENTS

| | | | |
|---|---|---|---|
| 8,576,855 B2 * | 11/2013 | Sorrini ................. | H04L 49/604 370/395.6 |
| 9,521,055 B2 * | 12/2016 | Turlington .......... | H04L 12/4633 |
| 9,743,254 B2 | 8/2017 | Friday et al. | |
| 9,918,340 B1 | 3/2018 | Liu | |

(Continued)

FOREIGN PATENT DOCUMENTS

| | | |
|---|---|---|
| CN | 104935466 | 9/2015 |
| CN | 106371062 A | 2/2017 |

(Continued)

OTHER PUBLICATIONS

"Australian Application Serial No. 2020201459, First Examination Report mailed Oct. 16, 2020", pgs.

(Continued)

*Primary Examiner* — Obaidul Huq
(74) *Attorney, Agent, or Firm* — Shumaker & Sieffert, P.A.

(57) ABSTRACT

Methods and apparatus for obtaining status from an isolated AP that cannot connect to a remote management server are described. The status information is obtained from a second (Continued)

device and then provided, via the second device, to the remote management server. At least some of the disclosed embodiments are utilized in a system including a plurality of access points, which can provide alternate pathways to the remote management server. The remote management server determines a remedial action based on the status information.

20 Claims, 11 Drawing Sheets

(56) References Cited

U.S. PATENT DOCUMENTS

| | | | |
|---|---|---|---|
| 10,116,709 B1 | 10/2018 | Kielhofner et al. | |
| 10,862,742 B2 | 12/2020 | Singh | |
| 12,003,363 B2 | 6/2024 | Jea et al. | |
| 2008/0263398 A1 | 10/2008 | Mori et al. | |
| 2010/0110885 A1 | 5/2010 | Qin et al. | |
| 2011/0032816 A1 | 2/2011 | Isaksson et al. | |
| 2011/0286345 A1* | 11/2011 | Goue | H04L 1/205 |
| | | | 370/252 |
| 2014/0051394 A1 | 2/2014 | Grech et al. | |
| 2014/0317461 A1 | 10/2014 | Li et al. | |
| 2015/0045022 A1 | 2/2015 | Prechner et al. | |
| 2015/0245229 A1 | 8/2015 | Gu et al. | |
| 2016/0057800 A1* | 2/2016 | Ingale | H04L 5/0032 |
| | | | 370/216 |
| 2017/0012887 A1 | 1/2017 | Ohta et al. | |
| 2017/0054843 A1* | 2/2017 | Ezell | H04M 3/4872 |
| 2017/0280351 A1 | 9/2017 | Skaaksrud | |
| 2017/0324608 A1 | 11/2017 | Ohta et al. | |
| 2017/0353877 A1 | 12/2017 | Kulkarni et al. | |
| 2018/0072223 A1 | 3/2018 | Arunachalam et al. | |
| 2018/0139086 A1 | 5/2018 | Chakraborty et al. | |
| 2019/0007847 A1* | 1/2019 | Abramovitz | H04L 43/06 |
| 2019/0124475 A1* | 4/2019 | Swart | H04W 4/33 |
| 2020/0287782 A1 | 9/2020 | Singh | |
| 2021/0044477 A1 | 2/2021 | Singh | |

FOREIGN PATENT DOCUMENTS

| | | |
|---|---|---|
| CN | 111669713 A | 9/2020 |
| EP | 3422637 A1 | 1/2019 |
| JP | 2020145675 A | 9/2020 |

OTHER PUBLICATIONS

"Chinese Application Serial No. 202010153011.9, Voluntary Amendment filed Jan. 6, 2021", w/ English Claims, 24 pgs.
"European Application Serial No. 20161634.9, Extended European Search Report mailed Jul. 9, 2020", 9 pgs.
Communication pursuant to Article 94(3) EPC from counterpart European Application No. 20161634.9 dated Jan. 31, 2022, 6 pp.
First Office Action and Search Report from counterpart Chinese Application No. 202111003073.2 dated May 5, 2022, 3 pp.
First Office Action and Search Report, and translation thereof, from counterpart Chinese Application No. 202010153011.9, dated Feb. 19, 2021, 7 pp.
Office Action from counterpart Canadian Application No. 3,070,840 dated Mar. 26, 2021, 4 pp.
Prosecution History from U.S. Appl. No. 16/296,902, now issued U.S. Pat. No. 10,862,742, dated Mar. 5, 2020 through Oct. 7, 2020, 108 pp.
Prosecution History from U.S. Appl. No. 17/081,331, dated Feb. 16, 2022 through Jan. 6, 2023, 73 pp.
Response to Communication pursuant to Article 94(3) EPC dated Jan. 31, 2022, from counterpart European Application No. 20161634.9 filed May 23, 2022, 20 pp.
Response to Extended Search Report dated Jul. 9, 2020, from counterpart European Application No. 20161634.9, filed Mar. 8, 2021, 37 pp.
Second Office Action from counterpart Chinese Application No. 202111003073.2 dated Nov. 24, 2022, 5 pp.
Notice of Intent to Grant and Text Intended to Grant from counterpart European Application No. 20161634.9 dated May 17, 2023, 54 pp.
Extended Search Report from counterpart European Application No. 23205320.7 dated Jan. 26, 2024, 10 pp.
Response to Extended Search Report dated Jan. 26, 2024, from counterpart European Application No. 23205320.7 filed Aug. 15, 2024, 29 pp.

* cited by examiner

METHOD FOR CONVEYING AP ERROR CODES OVER BLE ADVERTISEMENTS

CROSS REFERENCE TO RELATED APPLICATIONS

This application is a continuation of U.S. patent application Ser. No. 17/081,331, filed 27 Oct. 2020, entitled "Method for Conveying AP Error Codes over BLE Advertisements," which is a continuation of U.S. patent application Ser. No. 16/296,902, issued as U.S. Pat. No. 10,862,742, filed Mar. 8, 2019, the entire content of each application is incorporated herein by reference.

FIELD

One exemplary aspect relates to monitoring wireless communications systems and, more particularly, to methods and/or apparatus for determining a root cause of a network node, such as an access point (AP), not being able to connect to the backhaul network. This network node will be referred to as an isolated node.

BACKGROUND

An Access Point (AP) is a networking hardware device that allows a Wi-Fi device to connect to a wireless and/or wired network via Wi-Fi. The AP usually connects to a router (via a wired network) and is typically a standalone device, but the AP can also be an integral component of the router itself. While an exemplary aspect will be discussed in relation to the isolated node being an AP, it is to be appreciated that the technology described herein can be used with any networking device(s).

When for any reason an AP fails to connect to a wired network, all clients that rely on that AP for their communications lose their ability to communicate with devices attached to the wired network. Because of the criticality of the connectivity between the AP and the wired network, most network management/monitoring systems monitor the connectivity of the AP using keep-alive messages, or other similar techniques. If a network monitoring system detects a loss of connectivity between an AP and the wired network, an IT technician is informed via, for example, an alert message and is tasked with debugging and repairing the issue. Similarly, the loss of connectivity of an AP to the wired network affects all mobile device wireless terminals (WT) associated with the specific AP. As such, the loss of connectivity may be detected by the WT and reported to an IT technician by any of the WT users.

Connectivity of an AP to a wired network relies on multiple functions/services that the wired network facilitates. These services include, but are not limited to, authentication, authorization, accounting, IP address resolution, etc. Failure of an AP to connect to a wired network could be a result of a failure in any one of these services/functions. Often the abovementioned services are provided by equipment from different vendors or from a vendor different than the manufacturer of the Wi-Fi AP. To accelerate the debugging process, it can be beneficial to obtain information about the failure from the point of view of the isolated AP. However, because the isolated AP cannot connect to the wired network and/or the cloud, the Network Management System (NMS) cannot probe the isolated AP and request the AP to send debugging information the AP may have such as: error logs, message logs, connectivity logs, etc., and in general any information related to its operation (and/or failures).

When an IT technician wants to obtain debugging information that an isolated AP may have, such as error log, sequences of recent messages, etc., a person needs to go onsite to collect the information from the specific isolated AP that failed to connect to the wired network. Debugging information can be, and usually is, collected from the isolated AP by connecting a data collection device, such as a PC/laptop, and downloading the debugging information from the AP to the data collection device. Many companies consolidated their field support operations, and consequently, the field support centers may be located in a remote site other than the site where the isolated AP is located. To reduce the cost of collecting debugging information from an AP that cannot connect to the backhaul network, companies devised a simple LED based method for obtaining rudimentary debugging information from an AP.

When an isolated AP detects failure such as inability to connect to the backhaul network (the cloud), it analyzes the internal debugging information (including finding pattern of abnormal message flows, timer expiration when awaiting a reply message from another server, etc.), formats a message to facilitate the debugging process and conveys the debugging information to nearby observers by blinking a specific sequence of LEDs. The sequence may, and often does, use LEDs with different colors, change the duration of the LED blinking, change the frequency of the blinking, etc. Similar status messages may be conveyed to a nearby observer about normal operation of the AP. For example, a blue LED always on may convey a message that at least one WT is associated with the AP, a green LED always on may convey a message that no error was detected, etc.

Still, even with the LEDs, debugging requires as onsite observer available to spend time with a remote technician in support of the debugging process.

What is needed is a system that can facilitate conveying debugging information from an isolated AP, that cannot connect with the network/cloud, to IT personnel without requiring any onsite support.

SUMMARY

APs were first developed and used to provide wireless connectivity to WTs. With the increased importance of determining the location of mobile terminals, beacons were installed in an area of interest. Mobile devices, in the vicinity of the beacons, measure the (Received Signal Strength Indicator) RSSI of signals from each beacon and report it to a location engine over a Wi-Fi network. The location engine then uses the RSSI measurements from each terminal to determine the location of each mobile wireless terminal.

The specifics of determining the location of a user based on RSSI signal from their wireless device are described in U.S. Pat. No. 9,743,254 "Method And Apparatus Relating To The Use Of Received Signal To Determine Wireless Terminal Location And/Or Refine Location Determination Models," which is incorporated herein by reference in its entirety.

In accordance with one exemplary aspect, the beacon signal is a Bluetooth® Low Energy (BLE) signal, however, those skilled in the art will recognize that other beacons at other frequencies and/or power and/or protocols are covered by the described technology.

Since both the Wi-Fi AP and the location beacons need to provide coverage to the same or similar areas, it is only natural that manufacturers combined the functionality of these two devices into a single appliance.

In accordance with one exemplary aspect, under normal operations, this combined AP device utilizes a first frequency to establish a Wi-Fi communication with a WT and a second frequency, e.g., BLE, to enable the WT location estimations. A mobile device, e.g., a WT, receives the beacon signal from a plurality of beacons. Each beacon signal is broadcast periodically, e.g., once per second, and carries the ID of the specific beacon. The mobile device measures the RSSI received from each beacon and reports the RSSI back to the location engine. Reporting of the RSSI can be, and often is, done over the Wi-Fi network. In accordance with some aspects, the RSSI reporting can be done over BLE, or any other available network connectivity.

During operation, different components of the network are monitored by a network monitoring server. For example, network components may, and often do, send a periodic status and/or keep-alive message to the monitoring server(s). When a component experiences an issue, the component sends an error message to the monitoring service informing the monitoring service of the issue(s). The error message may contain additional information, e.g., internal log information, which can help a technician in the process of determining the root cause of the fault.

When the fault causes an AP to lose connectivity/communication with the network, the monitoring server can still detect the fault by detecting the absence of the keep-alive message. However, in this scenario, the monitoring server cannot access the logging information or any other status information in the isolated AP. To access the logging/fault information, an IT technician may need to be dispatched to the site where the fault occurred. Once on-site, the technician may connect to the AP via a local wireless connection, or via a wired connection, and download the information logged at the isolated AP. For companies that do not have a technician onsite, the process of collecting the logged information from a faulty isolated AP may be a costly proposition. To facilitate collection of information from a faulty AP, equipment manufacturers use a simple LED based method for obtaining rudimentary debugging information from an AP.

When an AP detects a failure, such as inability to connect to the cloud or lost connectivity to a wired network, the AP can analyze the internal debugging information, format a message to facilitate the debugging process and convey or communicate the debugging information to nearby observers by blinking a specific sequence of LED(s). The sequence may, and often does, use LEDs with different colors, change the duration of the LED blinking, change the frequency of the blinking, etc. Similarly, status messages may be conveyed to a nearby observer about normal operation of the AP. The observer may, and often does, record the LED blinking sequence and convey it to the IT maintenance team. For example, the observer may capture the LED blinking sequence by recording a short video clip of the blinking LED(s) and attach it to an IT fault reporting ticket, or just send it to the IT technician.

The LED blinking sequence can, and often does, utilize a single LED. An exemplary blinking message can, and often does, start with a single blink followed by a short pause and a sequence of consecutive blinks. The single blink marks the start of a message and the number of consecutive blinks denotes an error code number. For example, 1 blink followed by 2 blinks corresponds to error code 2 which signifies that the AP cannot reach the cloud. One blink followed by a pause and consecutive six blinks corresponds to error code 6 which signifies that mutual authentication between the AP and the cloud is failing.

Alternatively, the LED sequence may, and often does, utilize multiple LEDs with different colors, or a single LED capable of emitting different colors. The specifics of the encoding the error code into a sequence of blinking LED(s) is not essential for the disclosed technology.

While the ability of an AP to convey its status by emitting a sequence of either single color or multi-color LED blinks alleviates the need to send a trained technician onsite for debugging a faulty AP, the method still requires manual intervention.

When an AP detects that it cannot connect to the backhaul network and/or to the cloud, the error reporting module (ERM) examines the internal log and creates a message that could facilitate identifying the root cause of the fault. In accordance with one aspect, the message contains the error code that the LED(s) are blinking. In accordance with another aspect, the ERM creates a comprehensive message which would have been more difficult to capture by simply observing the LED. For example, the ERM may create a message that includes the sequence of messages between the AP and the backhaul network (the cloud) leading to denial of associating the AP with the backhaul network. The specifics of the message are not essential for this disclosure and the technology discussed herein can work with any message that automatically notifies the monitoring server that the AP cannot perform some function, such as associate with the network, and provide information that facilitates determining the root cause of the fault.

In accordance with a specific aspect, once the monitoring service determines the root cause of the fault, it may, and often does, automatically initiate a recovery mechanism.

As explained above, when an AP detects that it cannot connect with the network the ERM forms a message (or selects one of multiple canned messages) to be sent to the monitoring server. Since the isolated AP cannot associate with the network, the message cannot be sent via the normal backhaul link, which usually utilizes a wired connection to a gateway, a switch, or to a router. In accordance with another specific aspect, the backhaul link may be a wireless link such as a radio-based link, a fiber optic link, or any other communications means.

To overcome this isolation issue, an exemplary aspect utilizes the beacon signal. As explained, this beacon signal can be part of the location system. The message that the ERM formed is passed to the broadcast beacon, e.g., the BLE location beacon. Upon receiving the message from the ERM, the beacon transmitter broadcasts the message from the ERM. In accordance with an exemplary aspect, the beacon system of each AP includes a transmitter and a receiver capable of listening for beacon messages from neighboring APs.

During normal operations, when an AP receives a normal location beacon message from a neighboring AP, which includes the ID of the beacon, the receiver ignores this message. However, when a receiver detects that a broadcast beacon message from a neighboring AP includes an error code and/or any additional debugging information, the receiving AP first determines if the AP has connectivity to the cloud. If the AP does, then the AP utilizes its backhaul connectivity and forwards the received message from the isolated AP to the monitoring server on behalf of the isolated AP.

If the receiving AP cannot connect to the cloud or network, it cannot forward directly the received message to the monitoring server. In accordance with one aspect, the receiving AP simply ignores the received message from the neighboring AP in this scenario. However, since the receiving AP does not have a backhaul communication link, its ERM can, and often does, form its own error message and broadcast the error message using its own location beacon.

In accordance with yet another aspect, the ERM of the receiving AP forms a message that includes the ID(s) of the respective neighboring isolated AP(s) which also cannot connect to the cloud/network. This enhanced status message is then transmitted using the location beacon of the receiving AP and helps the monitoring server assess the scope of the issue.

Once the neighboring AP receives the error and/or debugging information from the isolated AP, the neighboring AP forwards the error and/or debugging information to the network monitoring server to which it usually sends its own status and/or keep alive. However, any other server address may be configured as a recipient of error/debugging messages received from a neighboring isolated AP. In accordance with another aspect, the receiving device may be a mobile device such as a mobile phone whose location is tracked using the location server. In this case, the mobile device is configured to send RSSI information from neighboring beacons to a location server. When the mobile device receives an error message from an isolated device over, e.g., BLE broadcast, the mobile device may, and often does, forward the error message to the IP address of the location server the mobile device knows, and the location server in turn recognizes the message as an error message and forwards it to the network management server and more specifically to the network monitoring system which is part of the broader network management system.

In a redundant system, different APs utilize different backhaul channels and employ different servers to attach to the network. As such, the system assumes that at least one of the APs is still able to establish a connection to the cloud and facilitate the forwarding of error broadcast messages from an isolated neighboring APs to the monitoring server.

In accordance with another aspect, other devices such as mobile devices, WTs, etc., that receive the broadcast error message may be used to convey the error message to the network monitoring server.

When the monitoring server receives an error and/or debugging message from the ERM of an isolated AP that cannot connect to the cloud, the monitoring server analyzes the message and invokes a corrective action. Illustrative corrective actions include, but are not limited to, alerting an IT technician about the issue, displaying detailed information about the root cause of the issue on a screen of an IT technician, restarting a Dynamic Host Control Protocol (DHCP) server, restarting an AP, restarting a router, restarting a switch, restarting a gateway (GW), restarting an authentication, authorization, and accounting (AAA) server, etc.

Numerous variations on the above described method and apparatus are possible and will be apparent in view of the detailed description which follows.

BRIEF DESCRIPTION OF THE FIGURES

The aspects herein may be better understood by referring to the following description in conjunction with the accompanying drawings in which like reference numerals indicate identically or functionally similar elements, of which.

DETAILED DESCRIPTION

Figure 1:
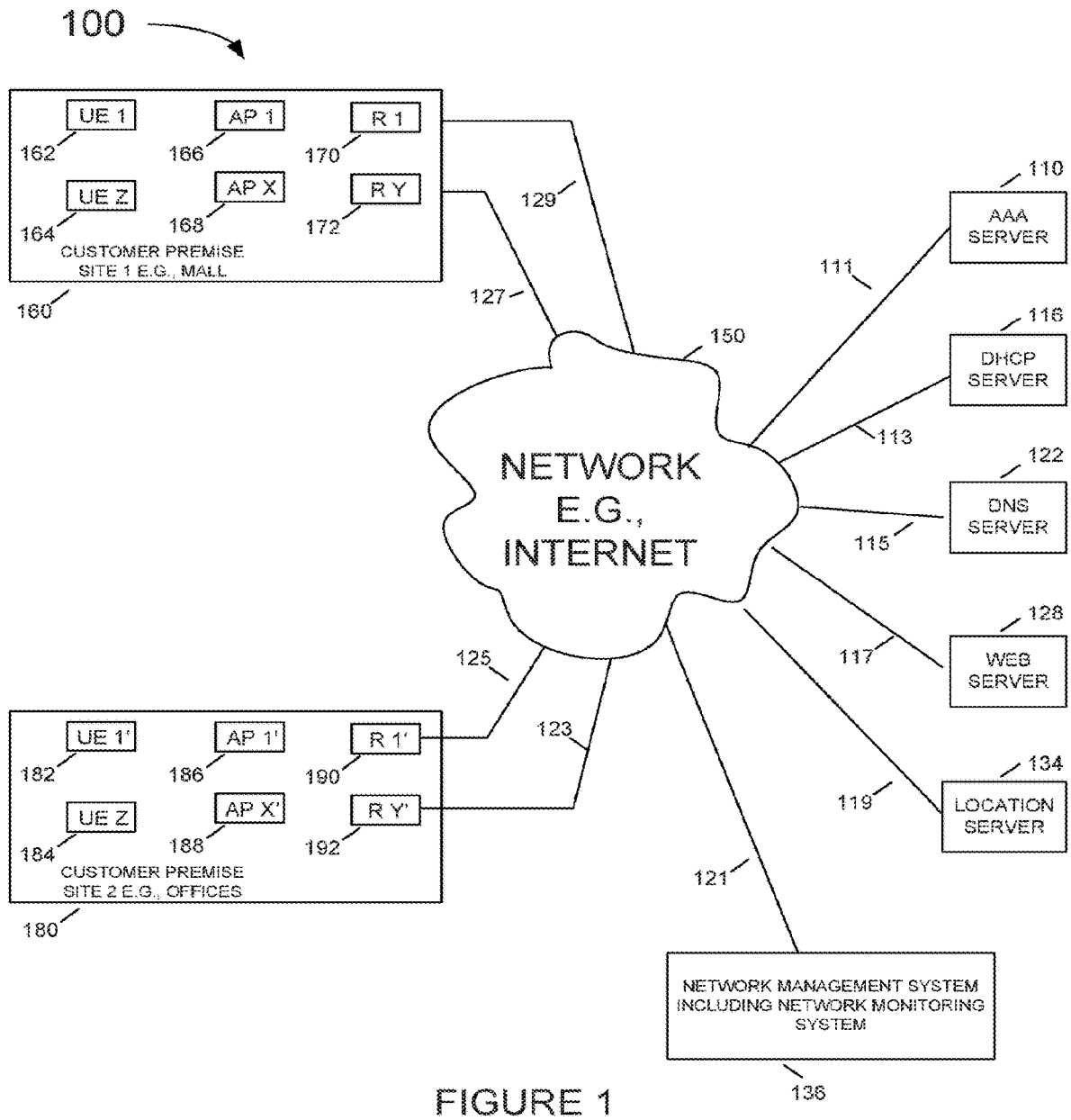
FIG. 1 is a block diagram illustrating an exemplary aspect of a network environment.

FIG. 1 illustrates an exemplary system 100. Exemplary system 100 includes a plurality of access points (API 166, . . . , AP X 168, AP 1' 186, . . . , AP X' 188), a plurality of Authentication, Authorization and Accounting (AAA) servers (only one AAA server 110 is shown), a plurality of Dynamic Host Configuration Protocol (DHCP) servers (only one DHCP server 116 is shown), a plurality of Domain Name System (DNS) severs (only one DNS server 122 is shown), a plurality of Web servers (only one Web server 128 is shown), a plurality of Location servers (only one Location server 134 is shown), and a network management system (NMS) 136, e.g., an access point management system, which are coupled together via network 150, e.g., the Internet and/or an enterprise intranet and/or a LAN and/or WAN.

Network communications links (127, 129, 123, and 125) couple the access points (API 166, AP X 168, AP 1' 186, AP X' 188), respectively, to network 150 using gateways or routers (R1 170, RY 172, R1' 190, and RY' 192) respectively. Network communications link 111 couples the AAA servers (only one AAA server 110 is shown) to network 150. Network communications link 113 couples the DHCP servers (only one DHCP server 116 is shown) to network 150. Network communications link 115 couple the DNS servers (only one DNS server 122 is shown) to network 150. Network communications link 117 couple the Web servers (only one Web server 128 is shown) to network 150. Network communications link 119 couple the Location servers (only one Location server 134 is shown) to network 150.

The exemplary system 100 further includes a plurality of user equipment devices (UE 1 162, . . . , UEZ 164, UE 1' 182, . . . , UE Z' 184). At least some of the UEs (162, 164, 182, 184) are wireless mobile devices (such as a smartphone) which may move throughout system 100.

In exemplary system 100, sets of access points are located at different customer premise sites. Customer premise site 1 160, e.g., a mall, includes access points (AP 1 166, . . . , AP X 168). Customer premise site 2 180, e.g., an office, includes access points (AP 1' 186, . . . , AP X' 188). As shown in FIG. 1, UEs (UE 1 162, . . . , UE Z 164) are currently located at customer premise site 1 160; UEs (UE 1' 182, . . . , UE Z' 184) are currently located at customer premise site 2 180.

In addition to facilitating Wi-Fi communication for wireless terminals UE 1, UE Z, UE 1', and UE Z', access points AP1, AP X, AP1', and AP X' also broadcast beacon signals. Wireless terminals UE 1, UE Z, UE 1', and UE Z' receive the beacon signals, measure the RSSI and report the RSSI via the Wi-Fi link and routers R1, RY, R1', and RY', to the location server 134. The measured RSSIs are then used by the location servers to calculate the location of the respective wireless mobile terminals. Beacon signals from any AP are often received by a neighboring AP and ignored.

Figure 2:
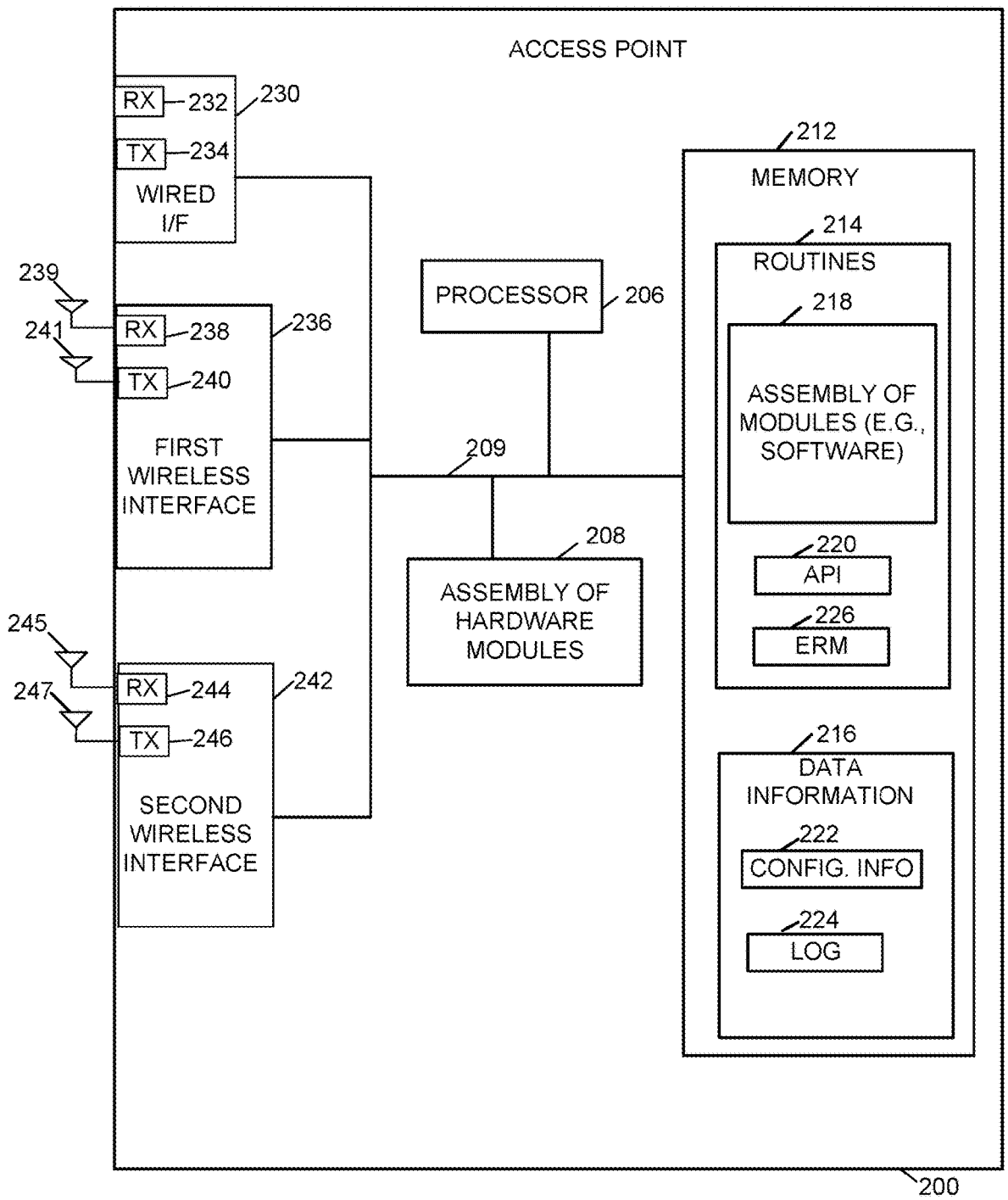
FIG. 2 is a block diagram illustrating an exemplary aspect of wireless access point.

FIG. 2 illustrates an exemplary access point 200 (e.g., access points AP 1 166, . . . , APX 168, AP 1' 186, . . . , APX' 188) in accordance with an exemplary aspect.

Access point 200 includes wired interfaces 230, wireless interfaces 236, 242, a processor 206, e.g., a CPU, a memory 212, and an assembly of modules 208, e.g., assembly of hardware modules, e.g., assembly of circuits, coupled together via a bus 209 over which the various elements may interchange data and information. Wired interface 230 includes receiver 232 and transmitter 234. The wired interface couples the access point 200 to a network and/or the Internet such as 150 of FIG. 1 via routers such as R1, RY, R1', and RY'. First wireless interfaces 236 may support a Wi-Fi interface, e.g. IEEE 802.11 interface, and includes receiver 238 coupled to receive antenna 239, via which the access point may receive wireless signals from communications devices, e.g., wireless terminals, and transmitter 240 coupled to transmit antenna 241 via which the access point may transmit wireless signals to communications devices, e.g., wireless terminals.

Second wireless interface 242 may support Bluetooth® communications which includes receiver 244 coupled to receive antenna 245, via which the access point may receive wireless signals from neighboring communications devices (e.g., other access points, wireless terminals, etc.) and transmitter 246 coupled to transmit antenna 247 via which the access point may transmit wireless signals (e.g., beacon signals, broadcast messages, etc.) to communications devices, (e.g., other access points, wireless terminals, etc).

Memory 212 includes routines 214 and data/information 216. Routines 214 include assembly of modules 218, e.g., an assembly of software modules, and Application Programming Interfaces (APIs) 220. Data/information 216 includes software configured to store and/or obtain configuration information 222, log information 224 and manage error reporting for the ERM 226 which monitors connectivity of the AP to the cloud 150. Upon detecting that the AP cannot connect to the cloud, the AP, and in particular the ERM 226, formulates a message to be sent to the monitoring system 136 of FIG. 1. The message is then conveyed to a beacon and broadcast via beacon transmitter 246 to neighboring APs. The broadcast error message from an isolated AP, which was disconnected from the network 150, is received by a wireless receiver 244 in a neighboring AP(s). Assuming that the neighboring AP has connectivity to the cloud 150, this neighboring AP conveys the received error message to the network management system 136 of FIG. 1.

Figure 3:
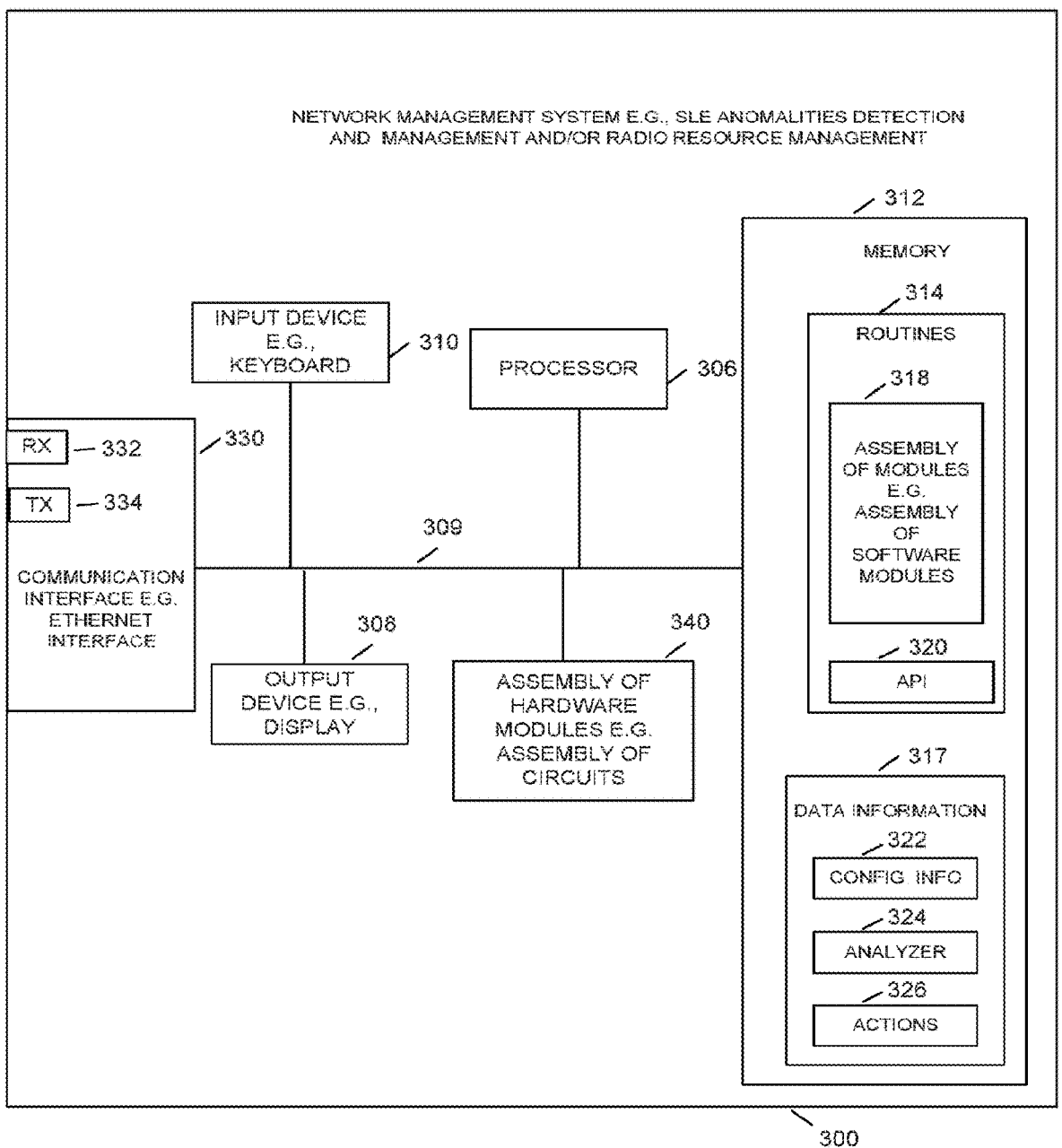
FIG. 3 is a block diagram illustrating an exemplary aspect of network management system that determines which SLE (Service Level Expectation) deterioration would require manual intervention.

FIG. 3 illustrates an exemplary network management and monitoring system 300, e.g., a wireless system monitoring server, an access point management node, or the like, in accordance with an exemplary aspect. In some aspects, the network monitoring system 300 of FIG. 3 is network management system (NMS) 136 of FIG. 1. Network management system 300 includes a communications interface 330, e.g., an Ethernet interface, a processor 306, an output device 308, e.g., display, printer, etc., an input device 310, e.g., keyboard, keypad, touch screen, mouse, etc., a memory 312 and an assembly of modules 340, e.g., assembly of hardware modules, e.g., assembly of circuits, coupled together via a bus 309 over which the various elements may interchange data and information. Communications interface 330 couples the network monitoring system 300 to a network and/or the Internet 150 of FIG. 1. Communications interface 330 includes a receiver 332 via which the network monitoring system can receive data and information, e.g., including service related information, (e.g., keep alive messages from various APs, error messages from various network components of network 100, etc.), and a transmitter 334, via which the network monitoring system 300 can send data and information, e.g., including configuration information and instructions, e.g., instructions to access points to restart, change transmission power, add an SSID, instruction to cloud servers (e.g., AAA server, DHCP server, DNS server, etc.) instructing them to take corrective actions such as update their software, restart the server, etc. The network management system can use the output module 308 to display status of various network components, error messages, debugging related information, etc.

Memory 312 includes routines 314 and data/information 317. Routines 314 include assembly of modules 318, e.g., an assembly of software modules and/or instructions and Application Programming Interfaces (APIs) 320. Data/information 317 includes configuration information 322 as well as software for the operation of the component status and error message analyzer 324 and collection of remedial actions 326 to be taken when the network management system determines that an AP cannot connect to the cloud 150.

The remedial actions may be configured by the system administrator based on past experience(s). In accordance with some aspects, the remedial actions can be automatically invoked as soon as the network management server determines the root cause of the network fault. This root cause can be determined by detecting a loss of keep alive message from a specific AP and/or by analyzing error message(s) from another AP which was broadcast using the beacon signal.

Figure 4:
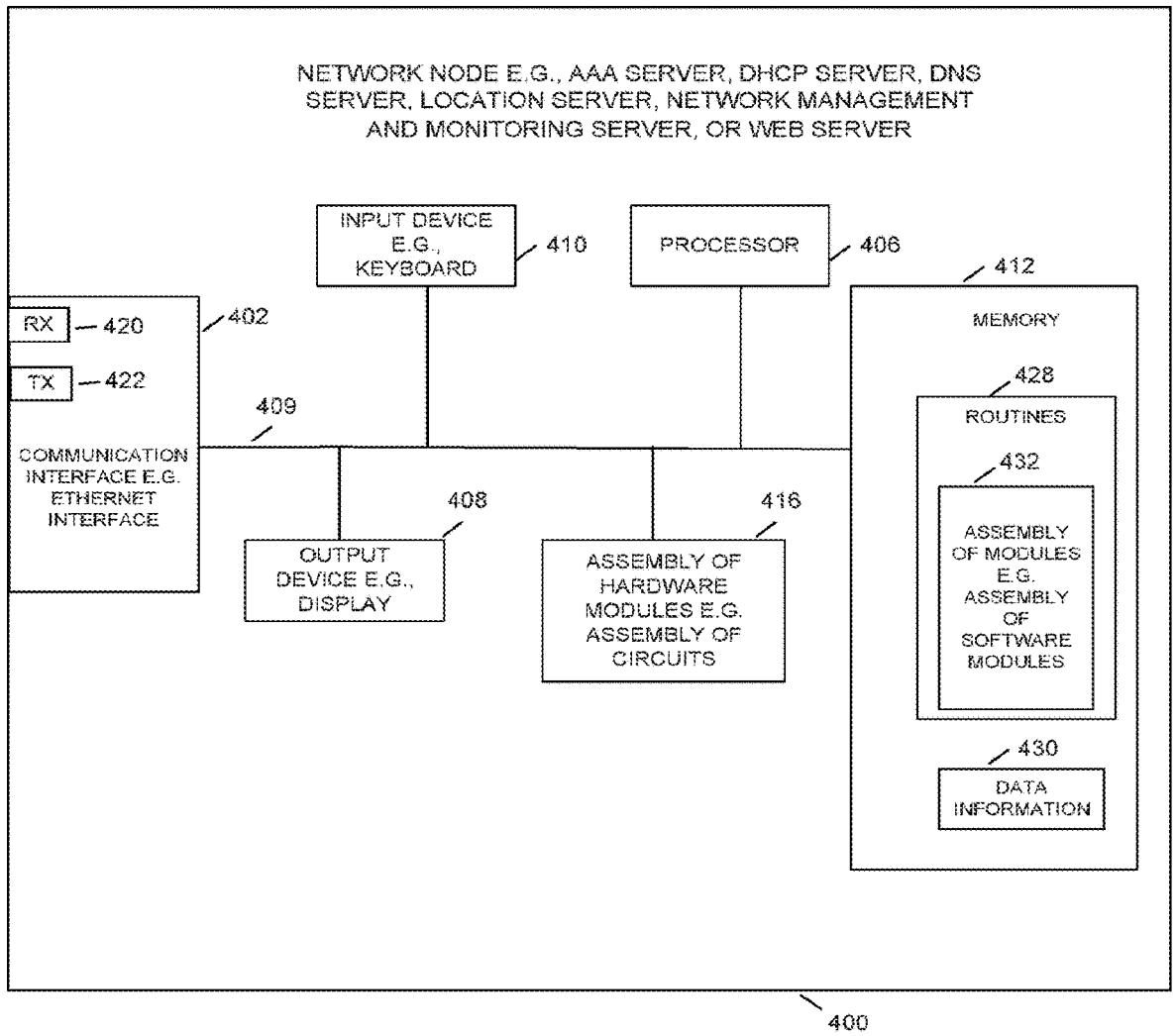
FIG. 4 is a block diagram illustrating an exemplary aspect of network node server.

FIG. 4 illustrates an exemplary node 400, e.g., AAA server, DHCP server, DNS server, Web server, Location server, etc. In some aspects, node 400 of FIG. 4 is server 110, 116, 122, 128, 134, of FIG. 1. Node 400 includes a communications interface 402, e.g., an Ethernet interface, a processor 406, an output device 408, e.g., display, printer, etc., an input device 410, e.g., keyboard, keypad, touch screen, mouse, etc., a memory 412 and an assembly of modules 416, e.g., assembly of hardware modules, e.g., assembly of circuits, coupled together via a bus 409 over which the various elements may interchange data and information. Communications interface 402 couples the network node 400 to a network and/or the Internet. Communications interface 402 includes a receiver 420 via which the node can receive data and information, (e.g., including operation related information, e.g., registration request, AAA services, DHCP requests, RSSI information, Simple Notification Service (SNS) look-ups, and Web page requests, etc.), and a transmitter 422, via which the node server 400 can send data and information, (e.g., including configuration information, authentication information, web page data, etc).

Memory 412 includes routines 428 and data/information 430. Routines 428 include assembly of modules 432, e.g., an assembly of software modules and data/information 430.

Figure 5:
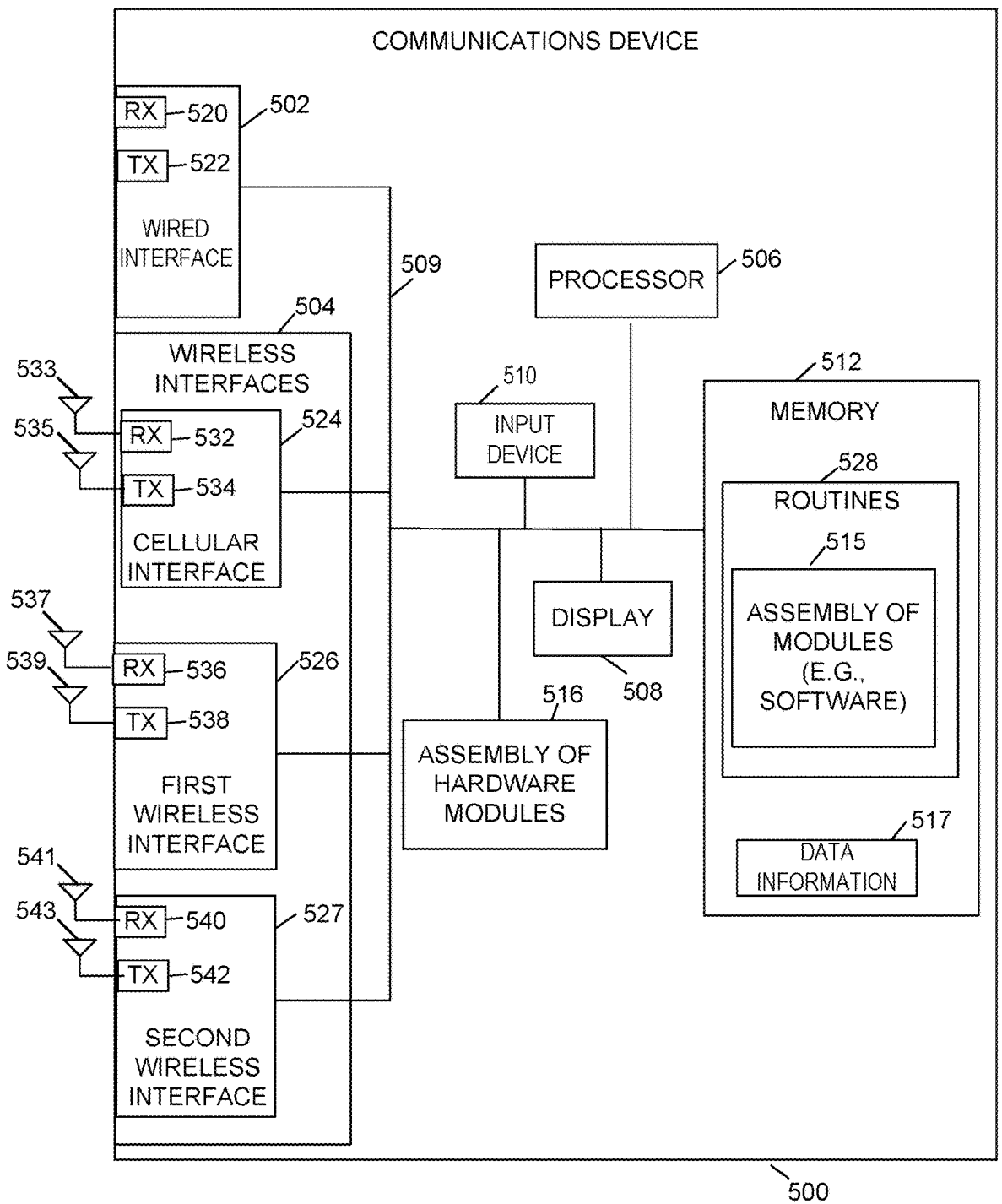
FIG. 5 is a block diagram illustrating an exemplary aspect of communication device such as UE.

FIG. 5 illustrates an exemplary client such as UE 500 (e.g., user equipment UE 1 162, . . . , UE Z 164, UE 1' 182, . . . , UE Z' 184) in accordance with an exemplary aspect.

UE 500 includes optional wired interfaces 502, wireless interfaces 504, a processor 506, e.g., a CPU, a memory 512, and an assembly of modules 516, e.g., assembly of hardware modules, e.g., assembly of circuits, coupled together via a bus 509 over which the various elements may interchange data and information. Wired interface 502 includes receiver 520 and transmitter 522. The wired interface couples the UE 500 to a network and/or the Internet 150 of FIG. 1.

The wireless interface 504 includes cellular interface 524, first wireless interface 526, e.g., 802.11 WiFi interface, and a second wireless interface 528, e.g., Bluetooth® interface. The cellular interface 524 includes a receiver 532 coupled to receiver antenna 533 via which the access point may receive wireless signals from access points, e.g., AP 1 166, . . . , APX 168, AP 1' 186, . . . , APX' 188, and transmitter 534 coupled to transmit antenna 535 via which the access point may transmit wireless signals to APs, e.g., AP 1 166, . . . , APX 168, AP 1' 186, . . . . APX' 188. First wireless interface 526 may support a Wi-Fi interface, e.g. 802.11 interface, and includes receiver 536 coupled to receive antenna 537, via which the UE may receive wireless signals from communications devices, e.g., APs, and transmitter 538 coupled to transmit antenna 539 via which the UE may transmit wireless signals to communications devices, e.g., APs. Second wireless interface 528 may support Bluetooth® which includes receiver 540 coupled to receive antenna 541, via which the UE may receive wireless signals such as broadcasted beacon signals from communications devices, e.g., APs, and transmitter 542 coupled to transmit antenna 543 via which the UE may transmit wireless signals to communications devices, e.g., APs, smart watch, etc.

Memory 512 includes routines 528 and data/information 517. Routines 528 include assembly of modules 515, e.g., an assembly of software modules/instructions. Data/information 517 may include configuration information as well as any additional information required for normal operations of UE 500.

Figure 6:
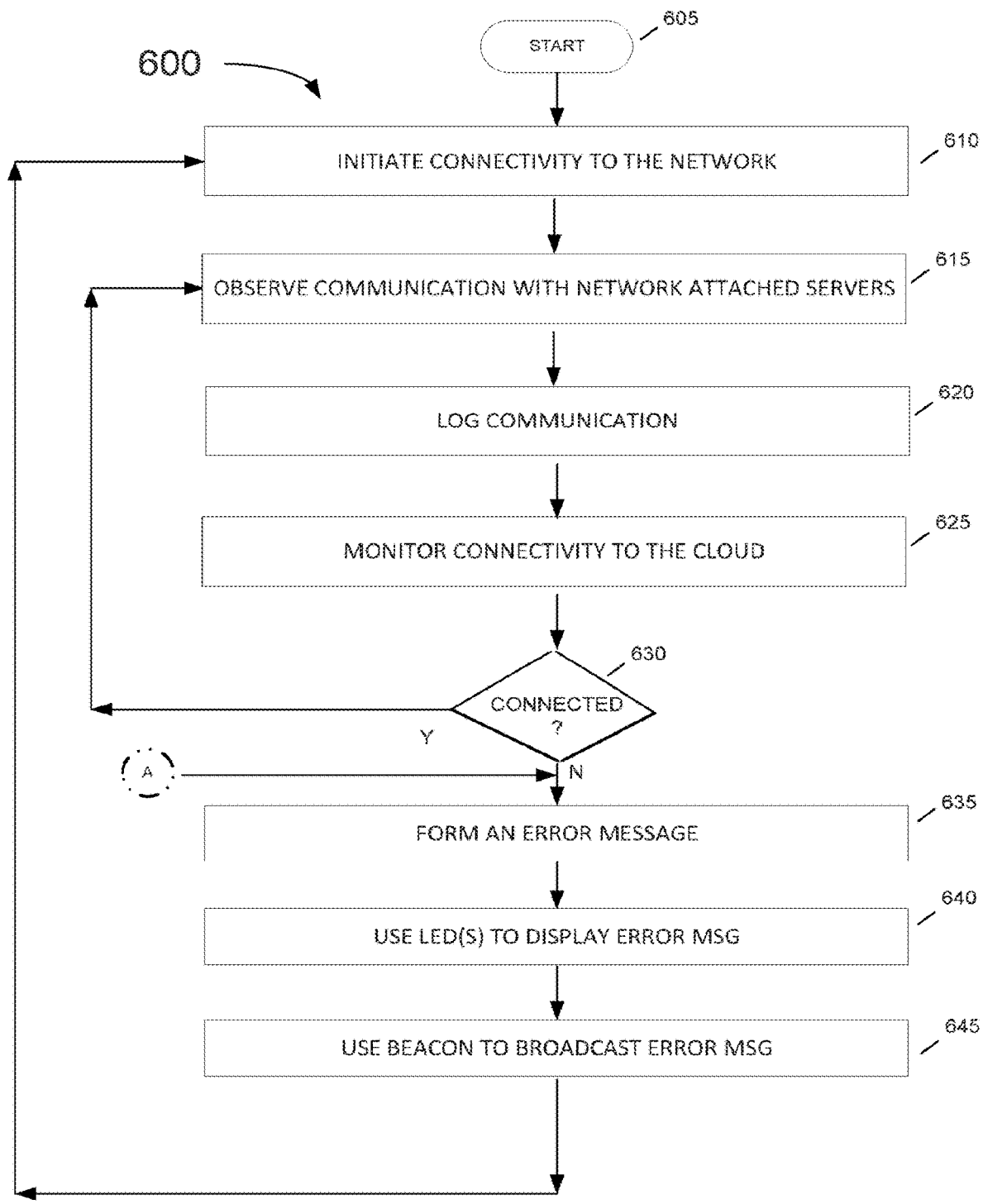
FIG. 6 is a flowchart illustrating an exemplary aspect of an AP process for monitoring connectivity to the cloud and taking an action when it cannot connect to the cloud.

FIG. 6 is a flowchart illustrating an exemplary process 600 used by an AP. The process starts in step 605 and proceeds to step 610 where the AP initiates connection to the network 150 such as the enterprise intranet, the internet or in general to the cloud. In step 615 the AP monitors the message exchange with the various servers that control and facilitate the association of the AP with the cloud 150. The process proceeds to step 620 where the message exchange and/or the internal status of the AP is stored in a log.

The process proceeds to step 625 where the connectivity of the AP with the cloud 150 is monitored. AP may fail to connect to the cloud or otherwise, it may lose connectivity after initial connectivity has been achieved. For example, as part of the monitoring process, the AP may, and often does, send keep-alive messages to the NMS 136 and monitor the reply acknowledgement messages from the NMS.

The process continues to step 630 where the AP determines if the AP is still connected to the network. If the method detects that the AP is still connected to the network, the process loops back to 615 where the process continues to monitor the communication between the AP and the network including communication with other servers attached to the cloud 150.

However, it the method determines at step 630 that the AP cannot connect to the network or has lost connectivity to the network, the process continues to step 635 where the ERM module of the isolated AP forms, generates, assembles or selects an error message(s). Once the error message(s) is established in step 635, the process continues to step 640 where the error message is optionally displayed by the LED(s) informing observers in the vicinity of the isolated AP about the nature of the failure. The process then continues to step 645 where the error message is conveyed to the transmitter for the location beacon such as transmitter e.g., module 246 of FIG. 2, and broadcast over the wireless channel, e.g., over a BLE radio frequency. The process then loops back to step 610 where the process retries to establish connectivity to the network. The process of retrying to connect to the network/cloud may be a single event, a few attempts before stopping the attempt, or repeated periodically optionally after rebooting, or the like.

Figure 7:
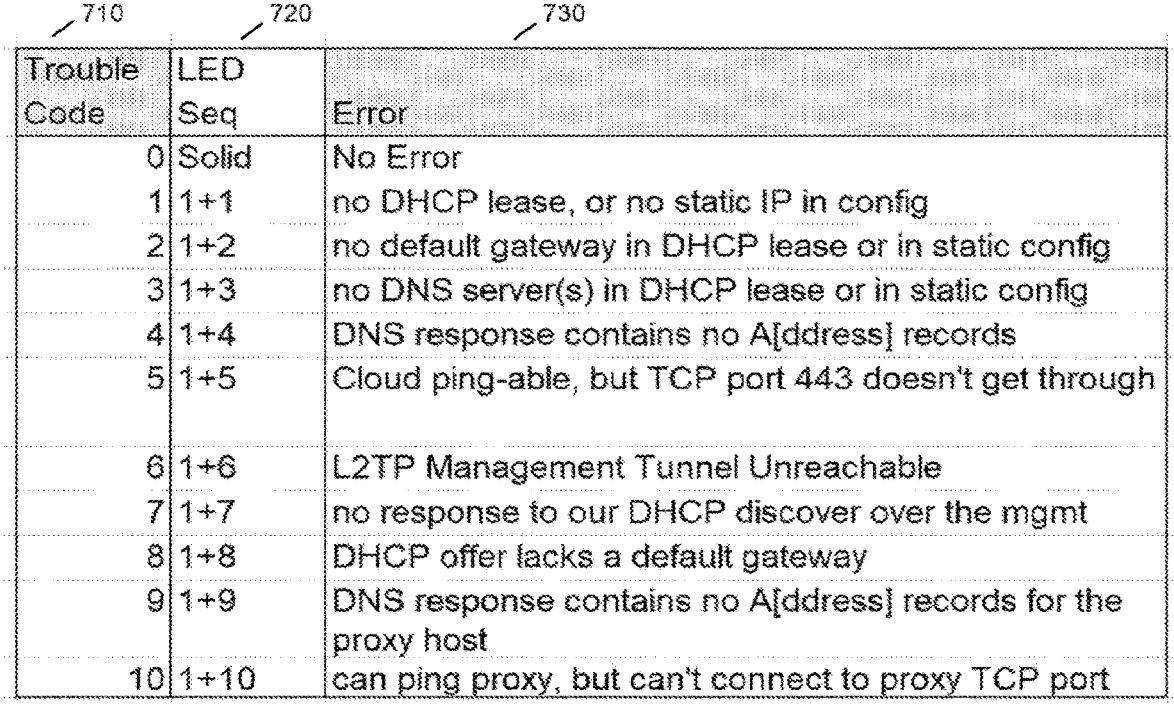
FIG. 7 is an example for table of error codes and corresponding LED sequences.

FIG. 7 is an illustrative example of error codes and corresponding LED sequences 700 shown in table form. Column 710 illustrates various error codes that facilitate an exemplary way to convey information about specific issues that an isolated AP may encounter. Column 720 provides an example of a sequence of blinking that may visually convey an error code to an observer near the AP. For example, the sequence of LED blinking to convey an error code 1 is a blink, short pause (denoted by the + sign) followed by a single blink, long pause, and then repeat this sequence. To convey error code 2 the LED follows the following sequence: a blink, short pause followed by 2 blinks, long pause, and then repeat this sequence. In general, to convey error code n the LED follows the following sequence: a blink, short pause followed by a n blinks, long pause, and then repeat this sequence. Column 730 provides verbal explanations about the nature of the error and column 710 provides the serial number of each error code.

Figure 8:
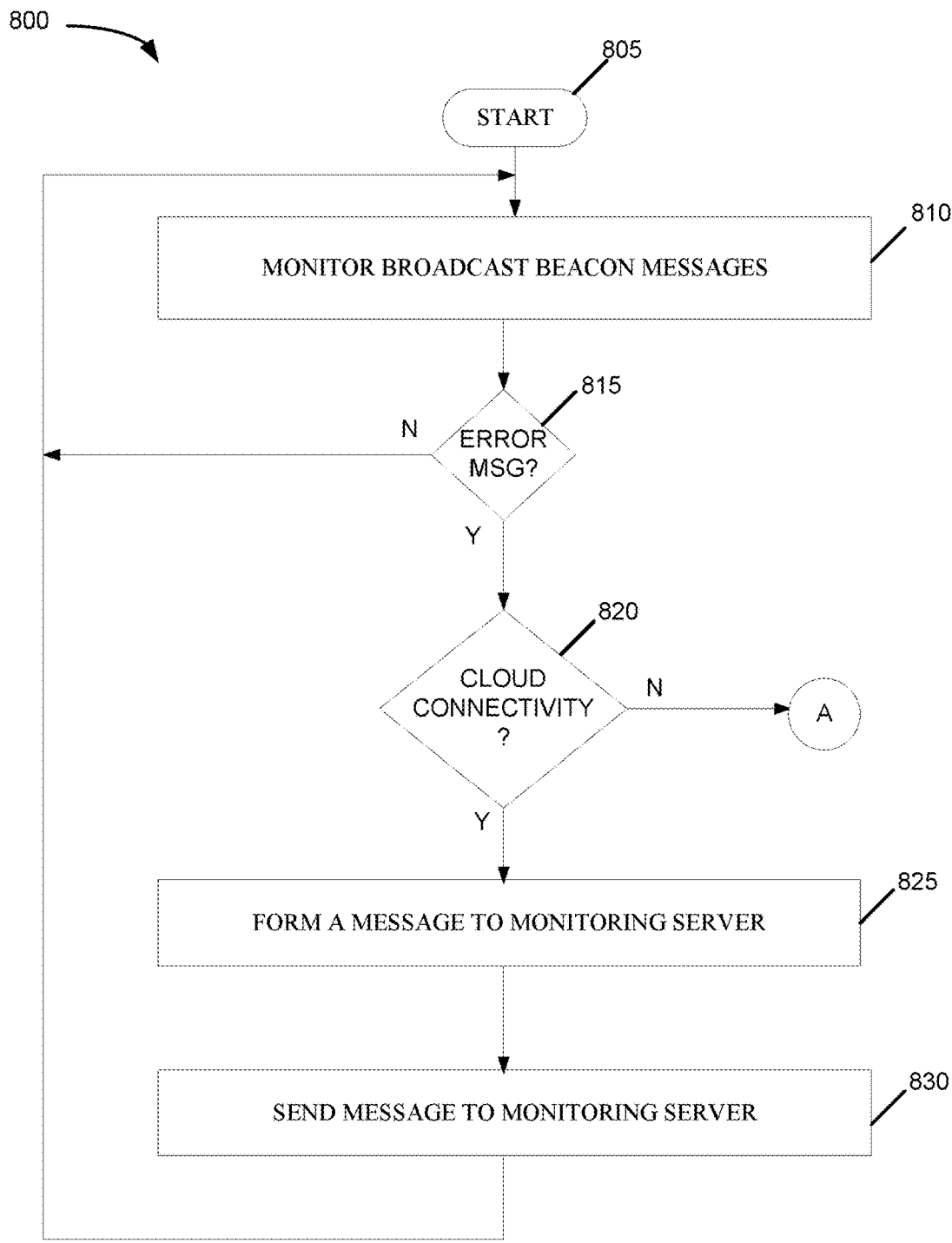
FIG. 8 is a flowchart illustrating an aspect of a process for a device receiving a broadcast error message from an isolated AP which is not able to connect to the cloud.

FIG. 8 is a flowchart illustrating an exemplary process 800 used by a neighboring device, e.g., an AP, WT, etc., that receives the broadcast error message from an isolated AP which is not being able to connect to the network/cloud.

In general, the isolated device broadcasts a message which includes its device ID as well as a trouble code, such as the codes described in FIG. 7, column 710. The receiving device takes the ID of the isolated device and trouble code (which it has received over the broadcast BLE channel) and forms a message to be sent over a normal e.g., IP LAN/WAN connected to the network management server. The payload in this message includes the ID of the isolated AP and the trouble code received from that AP.

These broadcasted messages are not sent too frequently, and the receiving devices keep a track of how many of each message type from the troubled entity are received. It then periodically reports this to the NMS with a count. This also allows the system to cleanly report when the trouble goes away, as the receiving entity will notice a drop and eventual disappearance of the trouble code.

The process starts step 805 and proceeds to step 810 where the method monitors broadcast beacon messages, e.g., BLE beacon messages. In step 815 the received beacon message is analyzed and a determination made whether the received broadcast message is a normal beacon message such as beacon messages that are used to facilitate identifying the location of mobile terminals.

If the method at step 815 determines that the received beacon message is a normal broadcast beacon message, the method loops back to step 810 and continues to monitor the airways for additional broadcast beacon messages. It should be noted that some devices may utilize the normal beacon message for other applications such as to facilitate determining the location of the device. For example, if the system determines that the beacon message is a normal beacon message used for location determination, a mobile device forms a location application specific message which includes the ID of the beacon and the RSSI of the beacon message and forwards it to the location server such as the location server 134 of FIG. 1. However, the disclosed technology addresses the treatment of specific beacon messages such as broadcasted error message, treatment of normal, non-error messages can optionally be ignored.

If in step 815 it is determined that the received broadcast beacon message is an error message from an isolated AP, the method proceeds to step 820. In step 820, it is checked whether the device that received the error message is connected to the network/cloud. If it is determined that the device that received the error message is not connected to the network/cloud, the process continues to step 635 of FIG. 6 where the device that received the error message may, and often does, also broadcast an error beacon message.

However, if in step 820 it is determined that the device that received the error message is connected to the network/cloud, the process continues to step 825 where an appropriate message is formed. This message may, and often does, include the error code received from the isolated AP which was not able to connect to the cloud. In accordance with another aspect the message may include also any additional information about the root cause of the issues experienced by the AP prior to its inability to connect to the cloud.

The process continues to step 830 where the message from step 825 is transmitted via the cloud/network to the network monitoring server. If the receiving device is one that has the IP address of the network management, the device may, and often does, send the message directly to the network management system. If the receiving device is a mobile device that is tuned to receive the BLE beacon and forward the RSSI from different beacons to the location server, such as server 134 of FIG. 1, the mobile device may, and often does, send the formatted error message to the IP address of the location server which would in turn recognize this message and forward it to the network management server 136. The process then loops back to step 810.

Figure 9A:
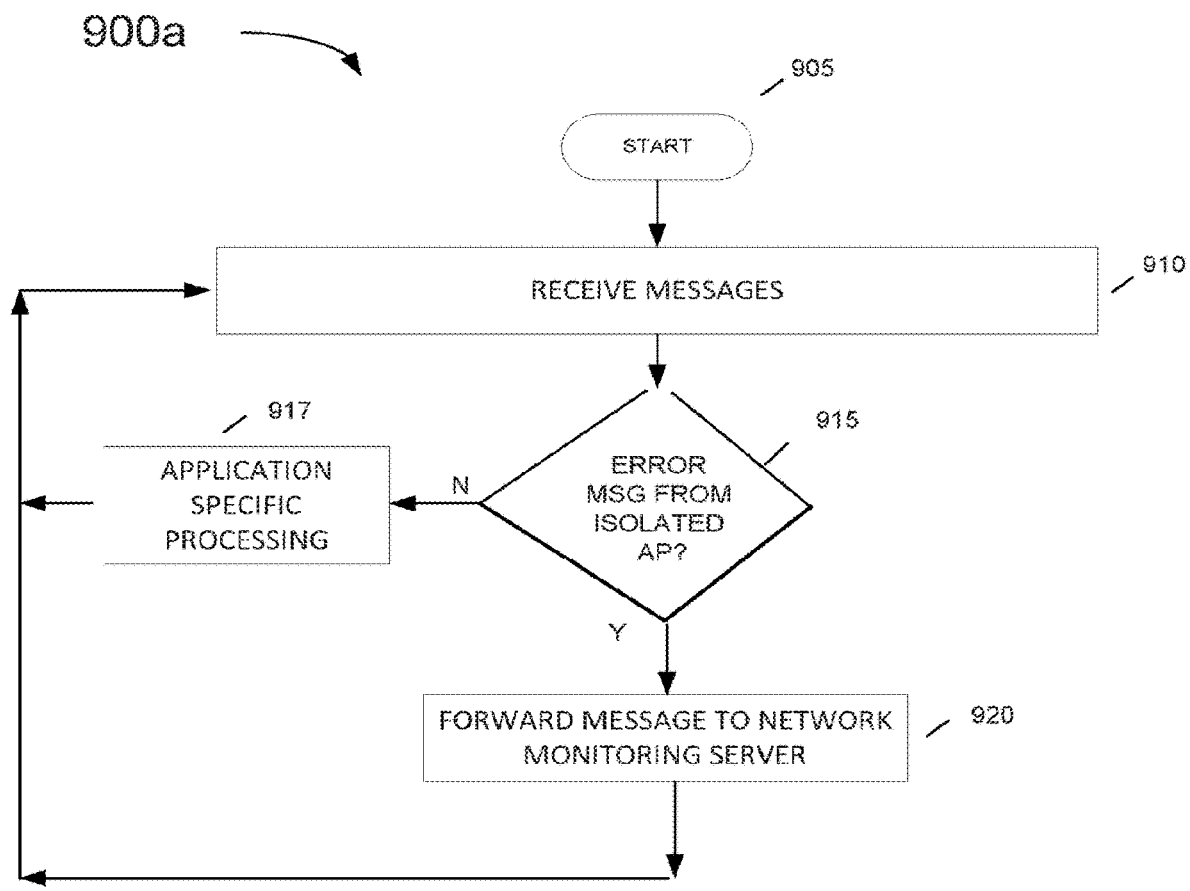
FIG. 9A is a flowchart illustrating an exemplary aspect of an application server such as a location server process receiving an error message reporting about an AP which is not able to connect to the cloud.

FIG. 9A is a flowchart illustrating an exemplary process 900 a used by an application server such as location server 134. The process starts in step 905 and proceeds to step 910 where the messages are received, such as messages received via internet receiver e.g., receiver 420 of FIG. 4. The received messages are analyzed in step 915 for whether they are messages from a neighboring device reporting about an isolated AP which cannot connect to the network/cloud.

If in step 915 it is determined that the received message is a normal application related message, e.g., a location related message from a mobile device reporting RSSI from a broadcasted beacon, and not a message from a neighboring device reporting about an isolated AP which does not have connectivity to the cloud, control loops back to step 910 and the system waits for a next received message. The utilization of this normal application specific message, such as RSSI message for location processing, is highlighted in step 917.

However, if in step 915 it is determined that the received message is a message from a neighboring device such as e.g., mobile device reporting about an isolated AP which cannot connect to the network/cloud, the process continues to step 920 where the method forwards the message with the ID of the isolated AP, the error code, and optionally any additional debugging information to the network monitoring server such as server 136 of FIG. 1.

Figure 9B:
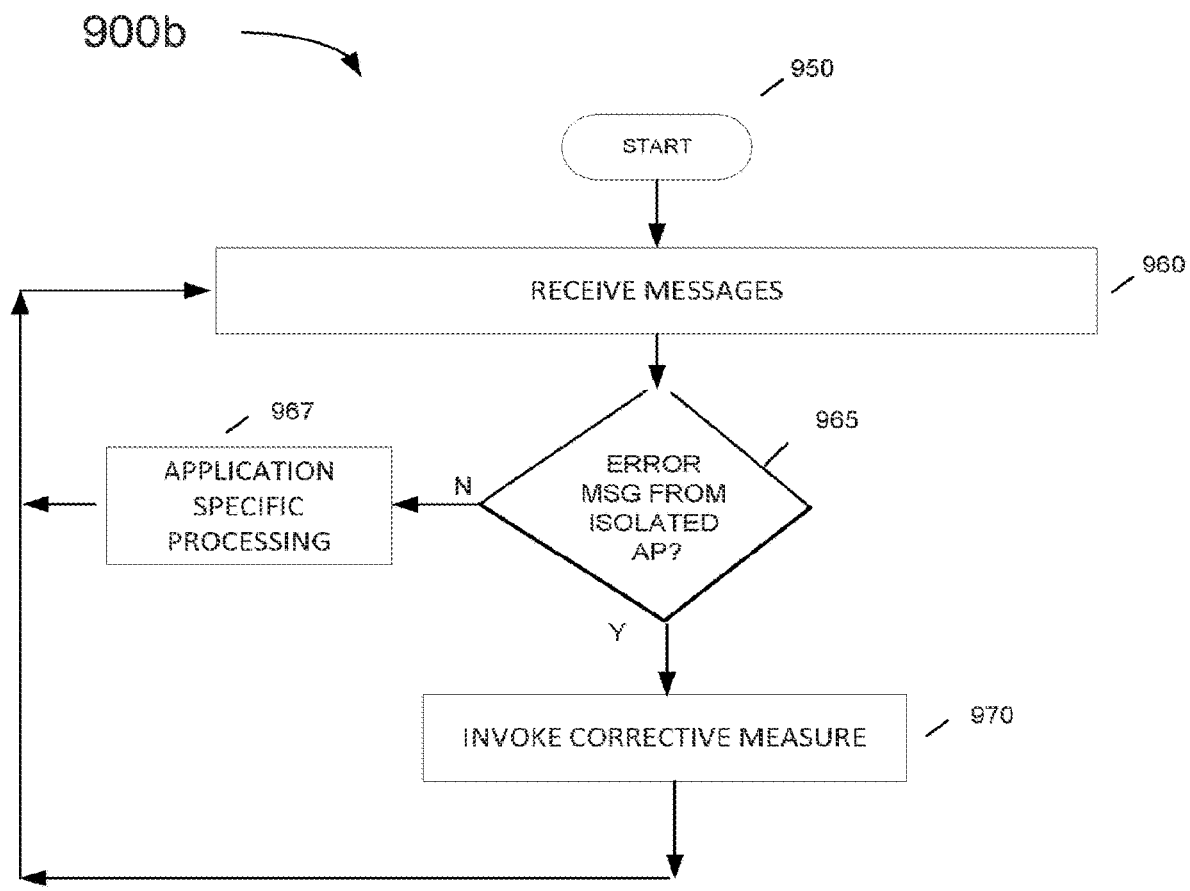
FIG. 9B is a flowchart illustrating an exemplary aspect of a network management process receiving an error message reporting about an AP which is not able to connect to the cloud.

FIG. 9B is a flowchart illustrating an exemplary process 900 b used by a network management server 136. The process starts in step 950 and proceeds to step 960 where the messages are received, such as messages received via internet receiver e.g., receiver 332 of FIG. 3. The received messages are analyzed in step 965 for whether they are messages from a neighboring device reporting about an isolated AP which cannot connect to the network/cloud. As previously indicated, these messages may be sent directly by the neighboring device to the network monitoring device, or alternatively, these messages may be sent by the receiving device to an application server such as the location server, which in turn forwards the message error message from the isolated AP to the network monitoring server 136.

If in step 965 it is determined that the received message is not a message from a neighboring device reporting about an isolated AP which does not have connectivity to the cloud, the method proceeds to step 967 where the network management system processes the messages in accordance with its normal operations which has nothing to do with our invention and as such is not elaborated in this write-up. The method then loops back to step 960 and the network monitoring system waits for a next received message.

However, if in step 965 it is determined that the received message is a message from a neighboring device reporting about an isolated AP which cannot connect to the network/cloud, the process continues to step 970 where the method invokes a corrective measure. The simplest corrective measure involves alerting an IT technician via a message on a screen such as module 308 of FIG. 3 or sending an alert message via a text message, an email, or an outbound call. According to another aspect the network management system invokes an automated corrective measure e.g., one or more of restarting a DHCP server, restarting AAA server, restarting a router, restarting a switch, reconfiguring a firewall, reconfiguring a server, etc. The specific remedial measure that the system should take in response to receiving a specific effort message can be, and often are, configured by an IT technician, or simply programmed into the system.

Figure 10:
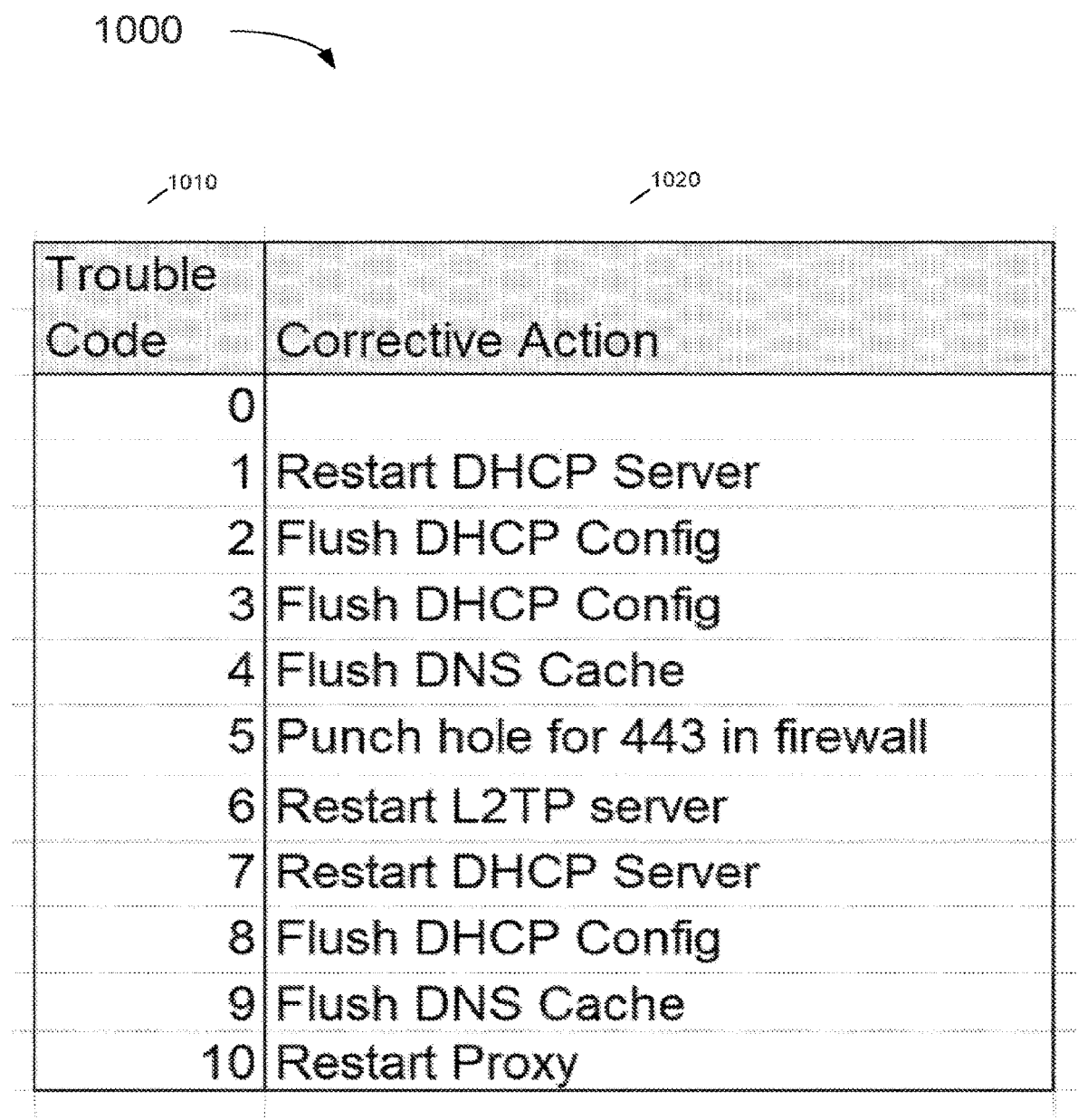
FIG. 10 is an illustration of an exemplary table 1000 which provides examples of automated corrective measures associated with error codes.

FIG. 10 is an illustration of an exemplary table 1000 which provides examples of automated corrective measures associated with error codes. Column 1010 of FIG. 10, which is the same as column 710 of FIG. 7, illustrates various error codes that facilitate an exemplary way to convey information about specific issues that an AP may encounter. These error codes originate at an isolated AP that cannot connect to the network/cloud, received by a neighboring device via a broadcast beacon message such as via Bluetooth® or BLE (or comparable communication protocol), and conveyed by the neighboring device connected to the network/cloud via a Wi-Fi link or a cellular link. When the network monitoring server, which is a part of the network management system, receives and analyzes the message, network monitoring server uses column 1020 of table 1000 to identify an appropriate remedial action. Examples of such remedial messages are provided in column 1020.

Numerous additional variations on the above described methods and apparatus are possible.

The techniques of various embodiments may be implemented using software, hardware and/or a combination of software and hardware. Various embodiments are directed to apparatus, e.g., mobile nodes, mobile wireless terminals, base stations, e.g., access points, communications system. Various embodiments are also directed to methods, e.g., method of controlling and/or operating a communications device, e.g., wireless terminals (UEs), base stations, control nodes, access points and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various embodiments devices and nodes described herein are implemented using one or more modules to perform the steps corresponding to one or more methods, for example, signal generation, transmitting, processing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine-readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the one exemplary aspect.

In some embodiments, the processor or processors, e.g., CPUs, of one or more devices, e.g., communications devices such as wireless terminals (WT), user equipment (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope of this disclosure. The methods and apparatus may be, and in various embodiments are, used with BLE, LTE, CDMA, orthogonal frequency division multiplexing (OFDM), and/or various other types of communications techniques which may be used to provide wireless communications links between access nodes and mobile nodes. In some embodiments the access nodes are implemented as base stations which establish communications links with user equipment devices, e.g., mobile nodes, using OFDM and/or CDMA. In various embodiments the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an onboard device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless switch, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December 2013); IEEE 802.11ad ("IEEE P802.11ad-2012, IEEE Standard for Information Technology—Telecommunications and Information Exchange Between Systems-Local and Metropolitan Area-Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks-Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3 GPP, Long Term Evolution (LTE), LTE advanced, Enhanced Data rates for GSM Evolution (EDGE), or the like. Other embodiments may be used in various other devices, systems and/or networks.

Some demonstrative embodiments may be used in conjunction with a WLAN (Wireless Local Area Network), e.g., a Wi-Fi network. Other embodiments may be used in conjunction with any other suitable wireless communication network, for example, a wireless area network, a "piconet", a WPAN, a WVAN, and the like.

Some demonstrative embodiments may be used in conjunction with a wireless communication network communicating over a frequency band of 2.4 Ghz, 5 GHz and/or 60 GHz. However, other embodiments may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward a method for mitigating, by a network monitoring server, the root cause of an AP not having a first communication channel with the cloud, the method comprising: collecting, by the isolated AP, information related to the root cause; upon detecting, by the isolated AP, that it cannot connect to the cloud over first communication channel, forming a status message; using a beacon signal over a second communication channel to broadcast the formed message; receiving, by a neighboring device the formed status message from the isolated AP over a second broadcasted channel; transmitting, by the neighboring device, the status message to the network monitoring server over a third communication channel; receiving, by the network monitoring server, the status message and automatically invoking a mitigating action.

Any of the above aspects, wherein collecting, by the isolated AP, information related to the root cause comprises of logging the message exchange between the AP and other servers attached to the cloud; analyzing the message exchange and determining abnormal messages or absence of reply messages from network attached servers.

Any of the above aspects, wherein forming a status message comprises: determining by the isolated AP an abnormal message flow; mapping the abnormal message flow of claim 2 to an error code; forming an error message with one or more of the elements comprising the error code, messages from isolated AP to servers attached to the cloud, messages received by the isolated AP from servers attached to the cloud, and/or timeout events detected by the isolated AP.

Any of the above aspects, wherein using a beacon signal over a second communication channel to broadcast the formed message comprises one or more of stop sending the normal beacon information and replace it with broadcasting the error message, alternate between sending normal beacon information and broadcasting the formed error message, broadcast the error message once over the beacon channel and then resume broadcasting normal beacon information.

Any of the above aspects, wherein first communication channel is a Wi-Fi or wireless communication channel. Any of the above aspects, wherein the second channel is a BLE broadcast communication channel. Any of the above aspects, wherein the third communication channel is one of a wired internet backhaul connectivity, a wireless Wi-Fi connectivity, and a cellular connectivity. Any of the above aspects, wherein invoking a correction measures comprises one or more of restarting a network attached device, configuring a network attached device, displaying error message, and/or providing formed error message information to a technician. Any of the above aspects, wherein the network attached server is one of DHCP server, AAA server, DNS server, a router, a switch, a proxy server, a firewall.

Additional exemplary aspects are directed toward a method to mitigate a root cause of an access point not having connectivity with a network comprising detecting, by an isolated access point, that connectivity to the network over a first communication channel has failed, automatically generating or acquiring, by a processor and memory, a status message related to the connectivity failure, automatically broadcasting, using a beacon signal, and over a second communication channel different than the first communication channel, the status message, receiving, by a neighboring device, the status message from the isolated access point over the second communication channel, forwarding via transmitting, by the neighboring device, the status message to a network monitoring server over a third communication channel, the third communication channel being different than the first and second communications channels, receiving, at the network monitoring server, the status message, and automatically invoking a mitigating action for the isolated access point.

Any of the above aspects, further comprising logging messages exchanged between the isolated access point and other servers, analyzing the message exchange; and determining abnormal messages or an absence of reply messages from the other servers.

Any of the above aspects, further comprising, determining by the isolated access point an abnormal message flow, mapping the abnormal message flow to an error code, forming an error message comprising one or more of the error code, messages from the isolated access point to one or more other devices, messages received by the isolated access point from one or more other devices, and/or timeout events detected by the isolated access point.

Any of the above aspects, wherein a normal beacon signal is not sent after the failure, the normal beacon signal being replaced with the beacon signal that includes the status message, the normal beacon signal is not always sent after the failure, the normal beacon signal being alternated with the beacon signal that includes the status message; or the normal beacon signal is not sent after the failure, the normal beacon signal being replaced with the beacon signal that includes the status message, then normal beacon signal broadcasting resumes.

Any of the above aspects, wherein first communication channel is a wired communication channel. Any of the above aspects, wherein the second channel is a Bluetooth broadcast communication channel. Any of the above aspects, wherein the third communication channel is one of: a wired communication channel, an Ethernet communication channel, a wired internet backhaul communication channel, a Wi-Fi communication channel, and a cellular communication channel. Any of the above aspects, further comprising one or more of restarting a network attached device, configuring a network attached device, displaying an error message; and/or providing error message information to a technician.

Any of the above aspects, wherein the network attached device is one of: a DHCP server, an AAA server, a DNS server, a router, a proxy server, and a firewall. Any of the above aspects, wherein communication from the isolated access point includes communication over one or more wireless transceivers to a mobile device. A system to mitigate a root cause of an access point not having connectivity with a network comprising an isolated access point including an error reporting module, processor and memory that detect that connectivity to the network over a first communication channel has failed the processor and memory automatically generating or acquiring a status message related to the connectivity failure, a transceiver that automatically broadcasts, with a beacon signal, and over a second communication channel different than the first communication channel, the status message, a second transceiver in a neighboring device that receives the status message from the isolated access point over the second communication channel, the second transceiver forwarding via transmission the status message to a network monitoring server over a third communication channel, the third communication channel being different than the first and second communications channels, the network monitoring server receiving the status message and automatically invoking a mitigating action for the isolated access point.

Any of the above aspects, further comprising storage that logs messages exchanged between the isolated access point and other servers, the processor further analyses the message exchange and determines abnormal messages or an absence of reply messages from the other servers.

Any of the above aspects, further comprising instructions that determine in the isolated access point an abnormal message flow, instructions that maps the abnormal message flow to an error code, instructions that form an error message comprising one or more of the error code, messages from the isolated access point to one or more other devices, messages received by the isolated access point from one or more other devices, and/or timeout events detected by the isolated access point.

Any of the above aspects, wherein a normal beacon signal is not broadcast after the failure, the normal beacon signal being replaced with the beacon signal that includes the status message, the normal beacon signal is not always broadcast after the failure, the normal beacon signal being alternated with the beacon signal that includes the status message; or the normal beacon signal is not broadcast after the failure, the normal beacon signal being replaced with the beacon signal that includes the status message, then normal beacon signal broadcasting resumes.

Any of the above aspects, wherein first communication channel is a wired communication channel. Any of the above aspects, wherein the second channel is a Bluetooth broadcast communication channel. Any of the above aspects, wherein the third communication channel is one of: a wired communication channel, an Ethernet communication channel, a wired internet backhaul communication channel, a Wi-Fi communication channel, and a cellular communication channel. Any of the above aspects, wherein the network monitoring server further automatically restarts a network attached device, automatically configures a network attached device, automatically displays an error message; and/or automatically provides error message information to a technician. Any of the above aspects, wherein the network attached device is one of: a DHCP server, an AAA server, a DNS server, a router, a switch, a proxy server, and a firewall.

Any of the above aspects, wherein communication from the isolated access point includes communication over one or more wireless transceivers to a mobile device. A system to mitigate a root cause of an access point not having connectivity with a network comprising means for detecting, by an isolated access point, that connectivity to the network over a first communication channel has failed, means for automatically generating or acquiring, by a processor and memory, a status message related to the connectivity failure, means for automatically broadcasting, using a beacon signal, and over a second communication channel different than the first communication channel, the status message, means for receiving, by a neighboring device, the status message from the isolated access point over the second communication channel, means for forwarding via transmitting, by the neighboring device, the status message to a network monitoring server over a third communication channel, the third communication channel being different than the first and second communications channels, means for receiving, at the network monitoring server, the status message; and means for automatically invoking a mitigating action for the isolated access point.

Any of the above aspects, further comprising means for logging messages exchanged between the isolated access point and other servers, means for analyzing the message exchange; and means for determining abnormal messages or an absence of reply messages from the other servers. Any of the above aspects, further comprising means for determining by the isolated access point an abnormal message flow, means for mapping the abnormal message flow to an error code, means for forming an error message comprising one or more of the error code, messages from the isolated access point to one or more other devices, messages received by the isolated access point from one or more other devices, and/or timeout events detected by the isolated access point.

Any of the above aspects, wherein a normal beacon signal is not sent after the failure, the normal beacon signal being replaced with the beacon signal that includes the status message, the normal beacon signal is not always sent after the failure, the normal beacon signal being alternated with the beacon signal that includes the status message; or the normal beacon signal is not sent after the failure, the normal beacon signal being replaced with the beacon signal that includes the status message, then normal beacon signal broadcasting resumes.

Any of the above aspects, wherein first communication channel is a wired communication channel. Any of the above aspects, wherein the second channel is a Bluetooth broadcast communication channel. Any of the above aspects, wherein the third communication channel is one of: a wired communication channel, an Ethernet communication channel, a wired internet backhaul communication channel, a Wi-Fi communication channel, and a cellular communication channel. Any of the above aspects, further comprising one or more of means for restarting a network attached device, means for configuring a network attached device, means for displaying an error message; and/or means for providing error message information to a technician.

Any of the above aspects, wherein the network attached device is one of: a DHCP server, an AAA server, a DNS server, a router, a switch, a proxy server, and a firewall. Any of the above aspects, wherein communication from the isolated access point includes communication over one or more wireless transceivers to a mobile device.

A non-transitory computer readable information storage media having thereon instructions that when executed perform any one or more of the above aspects. A system on a chip (SoC) including any one or more of the above aspects. One or more means for performing any one or more of the above aspects. Any one or more of the aspects as substantially described herein.

While the above-described flowcharts have been discussed in relation to a particular sequence of events, it should be appreciated that changes to this sequence can occur without materially effecting the operation of the embodiment(s). Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhancing and improving communications reliability. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A method comprising:
   detecting, by an access point, that the access point is unable to connect to a backhaul network over a first communication channel in accordance with a first protocol;
   generating, by the access point, a status message indicative of the access point being unable to connect to the backhaul network over the first communication channel and including identifiers of one or more isolated neighboring access points unable to connect to the backhaul network over the first communication channel in accordance with the first protocol, wherein the status message is included in a beacon signal in accordance with a second protocol different than the first protocol; and
   communicating, by the access point, and over a second communication channel in accordance with the second protocol, the beacon signal including the status message.

2. The method of claim 1 wherein the first protocol uses a distinct frequency range from the second protocol.

3. The method of claim 1, wherein the first protocol is a Wi-Fi protocol.

4. The method of claim 1, wherein the second protocol is Bluetooth® Low Energy (BLE).

5. The method of claim 1, wherein generating the status message further comprises analyzing internal debugging information at the access point.

6. The method of claim 1, further comprising:
   receiving the beacon signal including the status message at a receiving access point, and
   forwarding, from the receiving access point, the status message to a monitoring server using backhaul connectivity.

7. The method of claim 6, further comprising:
   receiving, at the monitoring server, the status message; and
   invoking, from the monitoring server, a corrective action.

8. The method of claim 1, further comprising:
   receiving the beacon signal of the status message at a mobile device, the mobile device monitoring beacon signals as part of a location operation, the mobile device being associated with a location server, and
   forwarding, from the mobile device, the status message to the location server.

9. A system, comprising:
   an access point comprising hardware processing circuitry and storage media configured to store instructions that when executed configure the hardware processing circuitry of the access point to perform operations comprising:
      detecting that the access point is unable to connect to a backhaul network over a first communication channel in accordance with a first protocol;
      generating a status message indicative of the access point being unable to connect to the backhaul network over the first communication channel and including identifiers of one or more isolated neighboring access points unable to connect to the backhaul network over the first communication channel in accordance with the first protocol, wherein the status message is included in a beacon signal in accordance with a second protocol different than the first protocol; and
      communicating, by the access point, and over a second communication channel in accordance with the second protocol, the beacon signal including the status message.

10. The system of claim 9, wherein the first protocol uses a distinct frequency range from the second protocol.

11. The system of claim 9, wherein the first protocol is a Wi-Fi protocol.

12. The system of claim 9, wherein the second protocol is Bluetooth® Low Energy (BLE).

13. The system of claim 9, wherein generating the status message further comprises analyzing internal debugging information at the access point.

14. The system of claim 9, further comprising:
    a receiving access point comprising hardware processing circuitry and storage media configured to store instructions that when executed configure the hardware processing circuitry of the receiving access point to perform operations comprising:
receiving the beacon signal including the status message, and
forwarding the status message to a monitoring server using backhaul connectivity.

15. The system of claim 14, further comprising:
the monitoring server comprising hardware processing circuitry and storage media configured to store instructions that when executed configure the hardware processing circuitry of the monitoring server to perform operations comprising:
receiving the status message; and
invoking a corrective action.

16. The system of claim 9, further comprising:
a mobile device comprising hardware processing circuitry and storage media configured to store instructions that when executed configure the hardware processing circuitry of the mobile device to perform operations comprising:
receiving the beacon signal including the status message, the mobile device monitoring beacon signals as part of a location operation, the mobile device being associated with a location server, and
forwarding the status message to the location server.

17. Non-transitory computer readable storage media comprising instructions that, when executed, configure hardware processing circuitry of an access point to perform operations comprising:
detecting that the access point is unable to connect to a backhaul network over a first communication channel in accordance with a first protocol;
generating a status message indicative of the access point being unable to connect to the backhaul network over the first communication channel and including identifiers of one or more isolated neighboring access points unable to connect to the backhaul network over the first communication channel in accordance with the first protocol, wherein the status message is included in a beacon signal in accordance with a second protocol different than the first protocol; and
communicating, by the access point, and over a second communication channel in accordance with the second protocol, the beacon signal including the status message.

18. The non-transitory computer readable storage media of claim 17, wherein the first protocol uses a distinct frequency range from the second protocol.

19. The non-transitory computer readable storage media of claim 17, wherein the first protocol is a Wi-Fi protocol.

20. The non-transitory computer readable storage media of claim 17, wherein the second protocol is Bluetooth® Low Energy (BLE).

* * * * *